United States Patent

Brooks

[11] Patent Number: 6,144,762
[45] Date of Patent: Nov. 7, 2000

[54] STEREO VIDEO MICROSCOPE

[75] Inventor: Richard Brooks, Atlanta, Ga.

[73] Assignee: Olympus America Inc., Melville, N.Y.

[21] Appl. No.: 09/027,417

[22] Filed: Feb. 23, 1998

[51] Int. Cl.[7] .................................................. G02B 21/22
[52] U.S. Cl. .......................... 382/154; 382/318; 600/111; 600/113; 359/378
[58] Field of Search ................................. 382/108, 133, 382/134, 141, 144–154, 283, 318, 312; 396/324; 359/369, 378, 377, 464, 465, 372, 373, 374, 375, 376; 600/111, 113, 166; 348/139, 45, 47, 49, 57, 80, 65, 72

[56] References Cited

U.S. PATENT DOCUMENTS

| | | | |
|---|---|---|---|
| 4,389,669 | 6/1983 | Epstein et al. | 358/101 |
| 4,648,113 | 3/1987 | Horn et al. | 381/1 |
| 4,651,201 | 3/1987 | Schoolman | 358/98 |
| 4,686,565 | 8/1987 | Ando | 358/101 |
| 4,709,263 | 11/1987 | Brumage | 358/88 |
| 4,737,972 | 4/1988 | Schoolman | 378/41 |
| 4,786,154 | 11/1988 | Fantone et al. | 350/508 |
| 4,938,205 | 7/1990 | Nudelman | 128/6 |
| 5,036,463 | 7/1991 | Abela et al. | 364/413.13 |
| 5,038,098 | 8/1991 | Birkel et al. | 324/121 R |
| 5,059,009 | 10/1991 | McKinley | 359/435 |
| 5,097,359 | 3/1992 | McKinley | 359/435 |
| 5,122,650 | 6/1992 | McKinley | 250/208.1 |
| 5,172,685 | 12/1992 | Nudelman | 128/6 |
| 5,191,203 | 3/1993 | McKinley | 250/208.1 |
| 5,200,838 | 4/1993 | Nudelman et al. | 358/443 |
| 5,260,800 | 11/1993 | Sturm et al. | 358/310 |
| 5,283,640 | 2/1994 | Tilton | 348/42 |
| 5,474,519 | 12/1995 | Bloomer | 600/111 |
| 5,588,948 | 12/1996 | Takahashi et al. | 600/111 |
| 5,673,147 | 9/1997 | McKinley | 359/462 |
| 5,751,341 | 5/1998 | Chaleki et al. | 348/65 |
| 5,825,534 | 10/1998 | Strahle | 359/376 |
| 5,828,487 | 10/1998 | Greening et al. | 359/466 |
| 5,835,264 | 11/1998 | Tandler et al. | 359/377 |
| 5,852,515 | 12/1998 | Kurata | 359/660 |
| 5,864,359 | 1/1999 | Kazakevich | 348/45 |
| 5,867,309 | 2/1999 | Spink et al. | 359/377 |

OTHER PUBLICATIONS

R. D. Lucier et al, "Single–Lens Stereoscopic Borescopes for Industrial Inspection", *Electronic Imaging '96*, (3 pages downloaded from http://www.imaging.org/ei96ei96 2653a–11.html on May 16, 1997).

*JMSA* Vol. 1 No. 2 (2 pages downloaded from http://www.msa.microscopy.com/JMSA/JMSA1995/vol. 1–2.html on May 16, 1997).

"Inspection Technologies for Industry and Science", *Optical Hybrids, Inc.*, (9 pages downloaded from http://www.3doptics.com/ on May 16, 1997).

"KAPPA Stereo Video Systems", *KAPPA Stereo Video Systems*, (6 pages downloaded from http://www.techexpo.com/WWW/kappa/stereo.html on May 16, 1997).

"Hi–Tech Electronics Home Page", *Hi Tech Electronics, Hirox 3D Video . . . , Coreco Image Board, Kodak Cameras*, (9 pages downloaded from http://www.hitech.com.sg/ on May 16, 1997).

Product brochure entitled, "Stereo Micro Vision", *Optical Hybrids, Inc.*

Product brochure entitled, "Optical Hybrids, Inc. Stereo Video System Configuration", *Optical Hybrids, Inc.*

*Primary Examiner*—Leo H. Boudreau
*Assistant Examiner*—Brian P. Werner
*Attorney, Agent, or Firm*—Straub & Pokotylo; John C. Pokotylo

[57] ABSTRACT

A three-dimensional video signal is generated by an objective lens, a stereo lens optical system, such as a stereo doublet lens for example, one or more image-to-signal converters, and a multiplexer. A three-dimensional monitor or two head mounted monitors may be used to render (e.g., display) the three dimensional video signal.

9 Claims, 8 Drawing Sheets

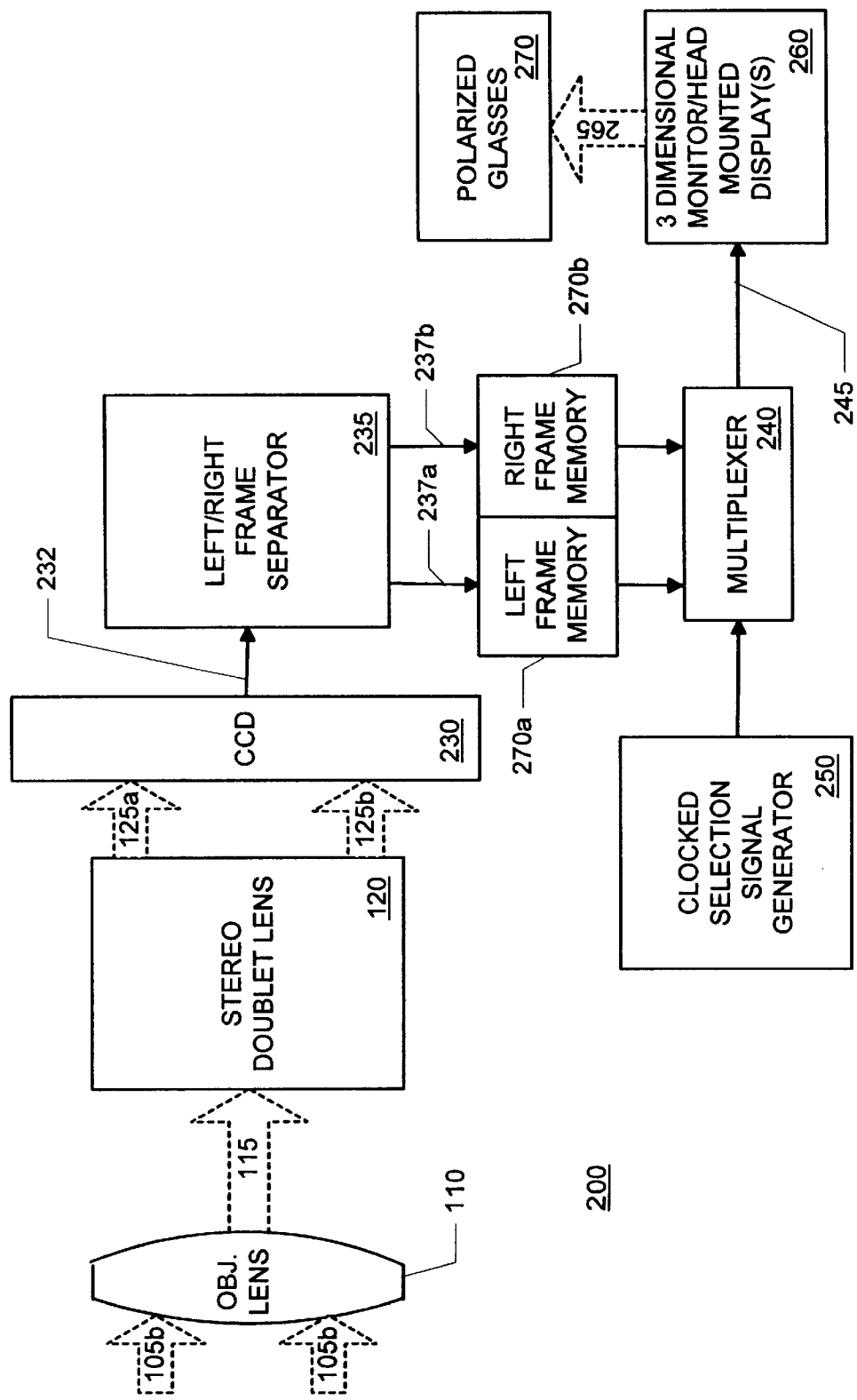

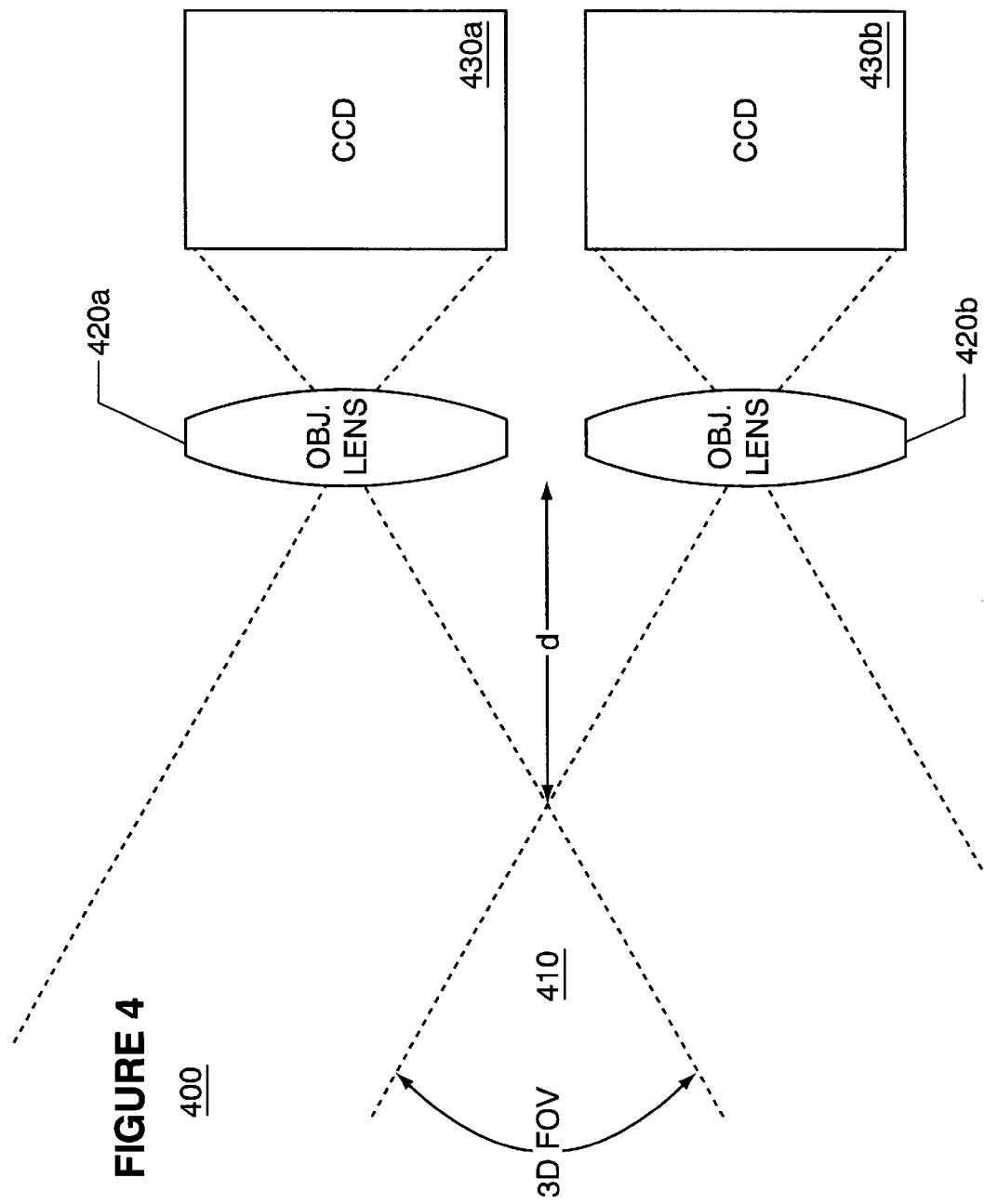

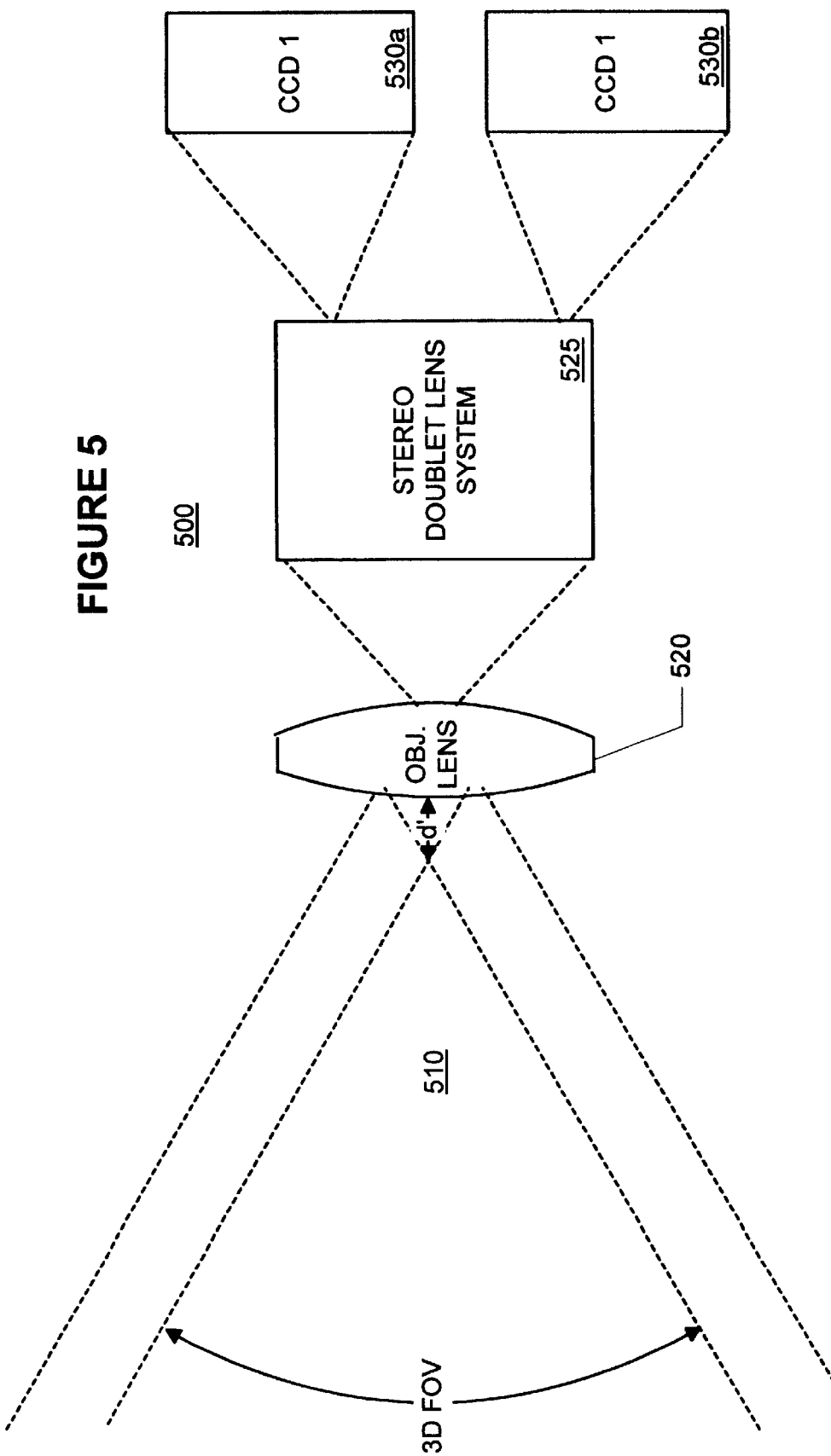

STEREO VIDEO MICROSCOPE

BACKGROUND OF THE INVENTION a. Field of the Invention

The present invention concerns methods and apparatus for providing a magnified, three-dimensional view of an object. More specifically, the present invention concerns a three-dimensional video microscope having a relatively small dimension such that it may be hand held. The present invention also concerns a three-dimensional video microscope that may be used in "contact" type microscopy applications.

b. Related Art

The field of microscopy may be divided into two (2) broad areas; "destructive" and "non-destructive". In destructive microscopy, a relatively small sample of an object is removed (hence the term "destructive") and brought to the microscope for viewing. In non-destructive microscopy, the microscope is brought to an object, and often brought into contact with the object, for viewing. Since a sample need not be removed from the object, the term "non-destructive" is used.

Video microscopes (such as model no. OVM/PV10 sold by Olympus America, Inc. of Melville, N.Y.) offer a portable and convenient way of observing objects in a non-destructive manner. Hand-held, contact type video microscopes are advantageous in that they can be brought to the object in instances where it would be difficult or undesirable to bring a sample of the object to the microscope. However, many video microscope users (and potential users) have become accustomed to using optical stereo microscopes. The stereo view permits the viewer to perceive depth, thereby enhancing surface detail. Unfortunately, however, optical stereo microscopes are fairly bulky, and cannot, in general be used in a contact-type operation where the objective lens actually contacts the object being viewed. Rather, present stereo microscopes typically operate in a "destructive" manner; that is, they require a relatively small sample to be removed from the object.

Stereo video cameras (such as those sold by KAPPA Opto-Electronic Systems, Inc. of City of Industry, Calif.) typically require two lens systems and are not used in microscopy applications.

Rotational three-dimensional microscopes (such as the HIROX 3-D sold by Hi-Tech Electronics PTE LTD of Singapore and Hirox Co. LTD of Tokyo Japan) are advertised as providing a realistic three dimensional view of an object. Unfortunately, however, such rotational three-dimensional microscopes require a precisely machined optical head which rotates two mirrors around a fixed point, while carrying a high magnification image. It is believed that the dynamic parts of such microscopes may wear and/or require realignment. Moreover, an external adapter required for three-dimensional imaging makes these systems somewhat bulky and cumbersome. Thus, it is believed that such three dimensional microscopes are not useful for "non-destructive" or contact type microscopy applications.

In view of the foregoing limitations of video microscopes, stereo video cameras, and rotational three dimensional microscopes, microscopes which provide a stereo (three dimensional) video signal, without requiring moving parts or particularly precise manufacturing, are needed. Such stereo video microscopes should be compact and preferably hand held. Moreover, such stereo video microscopes should be suitable for "non-destructive" and/or contact type applications.

SUMMARY OF THE INVENTION

The present invention teaches a device for providing a three-dimensional video image of an object. The device may include a stereo lens system, an object lens, an image-to-signal converter, a multiplexer, and means for rendering. The objective lens may be arranged between the object and the stereo lens system. The image-to-signal converter may be used for converting a pair of images, received from the stereo lens system, to a pair of signals. The multiplexer may be used for selectively providing an output signal from the pair of signals, based on a selection signal. The means for rendering may be used to render the output signal.

The present invention also teaches another device for providing signals for rendering three-dimensional video of an object. This device may include: (a) a stereo lens system; (b) an objective lens arranged between the object and the stereo lens system; (c) an image-to-signal converter for converting a pair of images, received from the stereo lens system, to a pair of signals; and (d) a multiplexer for selectively providing an output signal from the pair of signals, based on a selection signal.

The stereo lens system may be a stereo doublet lens. The image-to-signal converter may be a charge coupled device. The image-to-signal converter may include a first signal-to-image converter and a second signal-to-image converter. In this case, each of the first and second signal-to-image converters may be a separate charge coupled device. The means for rendering the output signal may include a video monitor which polarizes alternating input video frames perpendicular to one another. Alternatively, the means for rendering the output signal may include a head mountable device having a first video monitor and a second video monitor. In this latter means for rendering, each of the first and second video monitors may be a liquid crystal display.

An alternative image-to-signal converter may be provided for converting a pair of images, received from the stereo lens system, to a signal having a first portion and a second portion. In this case, a frame separator may be used for providing a first signal based on the first portion of the signal and a second signal based on the second portion of the signal.

The present invention also teaches a method for rendering a three-dimensional video image of an object. The method includes steps of: (a) relaying an image of the object to a stereo lens system; (b) providing first and second images from the stereo lens system to an image-to-signal converter; (c) converting the first and second images to first and second video signals; and (d) rendering the three-dimensional video image based on the first and second video signals.

The step of rendering may include sub-steps of: (i) polarizing the first and second video signal perpendicular to one another; and (ii) alternatingly displaying the polarized first and second video signals. Alternatively, the step of rendering may include a sub-step of separately displaying the first and second video signals on separate first and second video monitors.

Finally, the present invention teaches a device for generating a selected one of a mono and stereo video image of an object. This device may include a stereo image optics system, two objective lenses, two image-to-signal converter, a stereo video processor, a mono image optics system, a mono video processor, and means for selecting. A first of the two objective lenses is arranged between the stereo image optics system and the object. A first of the two image-to-signal converter may be used for receiving images from the stereo image optics system and for providing a stereo signal based on the received images. The stereo video processor is used for receiving the stereo signal and for providing a stereo video signal. A second of the two objective lenses is arranged between the mono image optics system and the object. A second of the two image-to-signal converters is used for receiving an image from the mono image optics system and for providing a mono signal based on the received image. The mono video processor is used for receiving the mono signal and for providing a mono video signal. Finally, the means for selecting is used for selecting at least one of the mono and stereo video signals for output.

Finally, the present invention teaches another device for generating a selected one of a mono and stereo video image of an object. This device includes, a stereo image optics system, a mono image optics system, means for arranging, an image-to-signal converter, a stereo video processor, a mono video processor, and means for providing. The means for arranging is used for arranging an objective lens between the object and a selected one of (i) the stereo image optics system and (ii) the mono image optics system. The image-to-signal converter is used for receiving images from the selected one of the stereo image optics system and the mono image optics system and for providing a signal based on the received images. The stereo video processor is used for providing a stereo video signal based on a received signal. The mono video processor is used for providing a mono video signal based on a received signal. Finally, the means for providing is used to provide the signal to a selected one of the stereo and mono video processors. This device may also include an image translocation means arranged between the image-to-signal converter and the stereo image optics system and the mono image optic system.

BRIEF DESCRIPTION OF THE DRAWINGS

FIG. 2 is a block diagram of another exemplary embodiment of a stereo video microscope in accordance with the present invention.

FIG. 4 illustrates a drawback of using a two lens stereo video system.

FIG. 5 illustrates an advantage of using a single lens stereo video system.

DETAILED DESCRIPTION

The present invention concerns a novel stereo video microscope. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown.

First, functions which may be performed by the present invention will be described. Then, the structures of exemplary embodiments of the present invention, and their operations, will be described.

Basically, the present invention may function to (i) obtain a stereo image of an object to be observed, (ii) convert the stereo image to a signal (e.g., an electrical signal) to be processed, (iii) process the signal for rendering a stereo (i.e., three dimensional) video image, and (iv) render (e.g., display) a three dimensional video image of the object. To obtain a stereo image of the object to be observed, the present invention may use a stereo doublet lens system to facilitate "contact" operation. The present invention may permit both stereo and mono operations to achieve the advantages of both. For example, stereo operation, as discussed above, permits a viewer to perceive depth and enhances surface detail. On the other hand, mono operation permits a viewer to zoom the image in and out using known optical systems.

Figure 1:
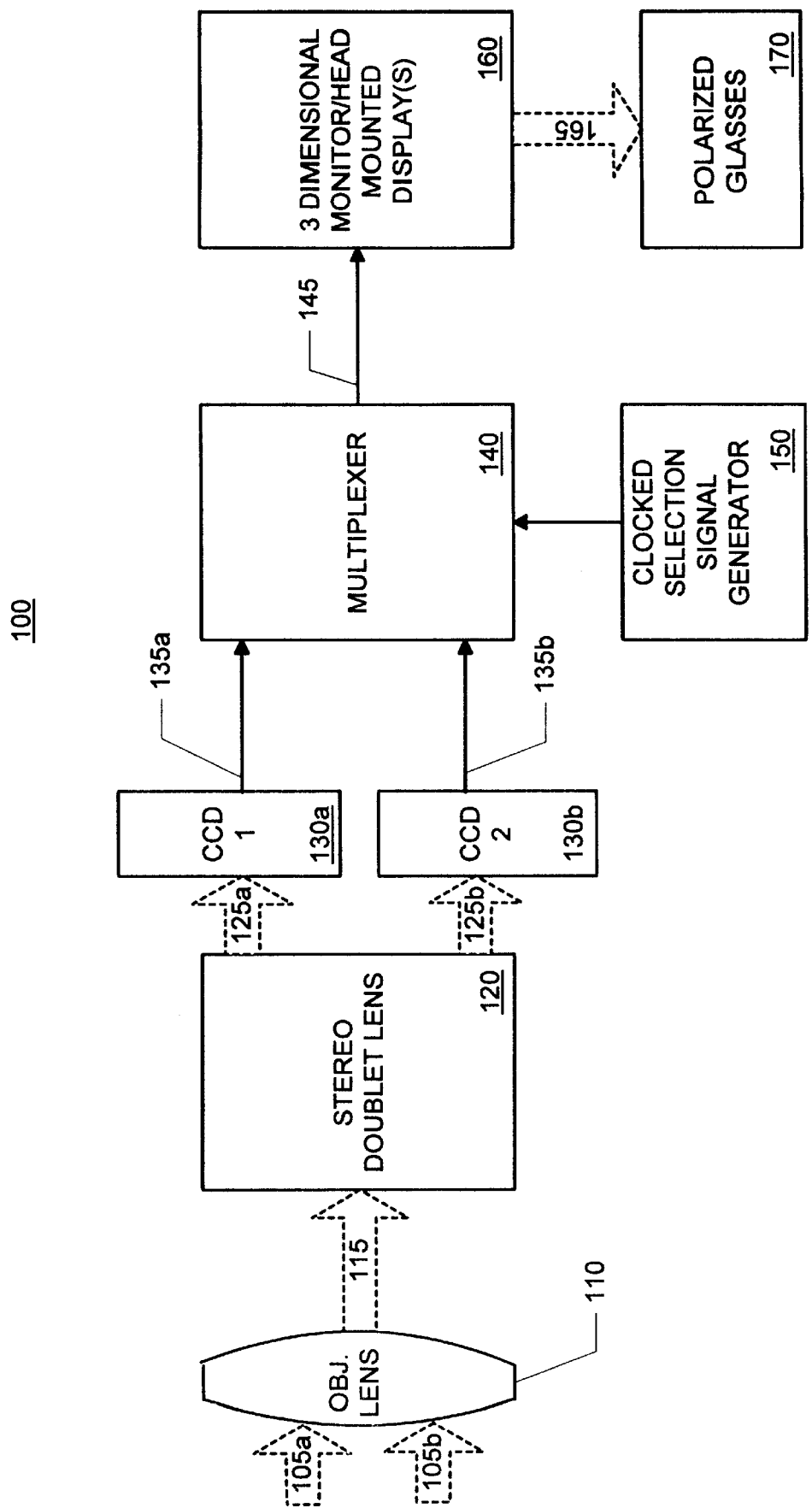
FIG. 1 is a block diagram of an exemplary embodiment of a stereo video microscope in accordance with the present invention.

Having introduced functions which may be carried out by the present invention, exemplary embodiments and their operations will now be described. FIG. 1 is a block diagram of an exemplary embodiment 100 of a stereo video microscope in accordance with the present invention. Images 105a/105b of an object (not shown) are focused by an objective lens 110 onto a stereo doublet lens 120. Examples of such a stereo doublet lens 120 are discussed in U.S. Pat. Nos. 5,122,650 and 5,191,203 to Harry McKinley (both incorporated herein by reference). The stereo doublet lens 120 provides images 125a and 125b to a first image-to-signal converter (e.g., a charge coupled device (or "CCD")) 130a and a second image-to-signal converter (e.g., a CCD) 130b, respectively. The images 125a/125b and the image-to-signal converters 130a/130b may correspond to left and right views of the object (not shown).

Each image-to-signal converter 130a/130b provides a signal 135a/135b to a multiplexer 140. If, for example, the image-to-signal converter 130a/130b is a CCD, then the signal will be an electrical signal. It is assumed that the image-to-signal converter 130a/130b has appropriate electronics (e.g., electronics to convert a clocked out sequence of electrical charges to a video frame) to provide a video frame. The multiplexer 140, under control of a clocking signal from the clocked selection signal generator 150, provides a selected one of the signals 135a or 135b as an output signal 145. Accordingly, the output signal will include alternating video signals 135a/135b.

The output signal 145 may be provided to a three-dimensional video monitor 160. The monitor 160 polarizes the alternating (e.g., left and right) video frames perpendicular to each other. When a viewer (not shown) wears special polarized glasses 170 having perpendicularly polarized lenses, each eye will only see one of the alternating video displays, thus creating a three dimensional viewing effect. Alternatively, two (2) small head mounted displays (e.g., liquid crystal devices (or "LCDs")) may render the alternating video signals to left and right eyes of a viewer wearing the head mounted displays.

FIG. 2 is a block diagram of another exemplary embodiment 200 of a stereo video microscope in accordance with the present invention. In this embodiment, a single image-to-signal converter 230 (e.g., a CCD) is used rather than two (2) image-to-signal converters as was the case in the embodiment 100 discussed above with reference to FIG. 1. Like the embodiment 100 of FIG. 1, in the embodiment 200 of FIG. 2, images 105a/105b of an object (not shown) are focused by an objective lens 110 onto a stereo doublet lens 120. However, in this case, the stereo doublet lens 120 provides images 125a and 125b to a single image-to-signal converter (e.g., a CCD) 230. The images 125a and 125b may be provided to separate regions of the image-to-signal converter 230. The images 125a/125b may correspond to left and right views of the object (not shown). The image-to-signal converter 230 provides a signal 232 to a left/right frame separator 235 which processes (e.g., electronically) the signal 232 such that a right half is masked out in signal 237a and a left half is masked out in signal 237b.

Figure 3B:
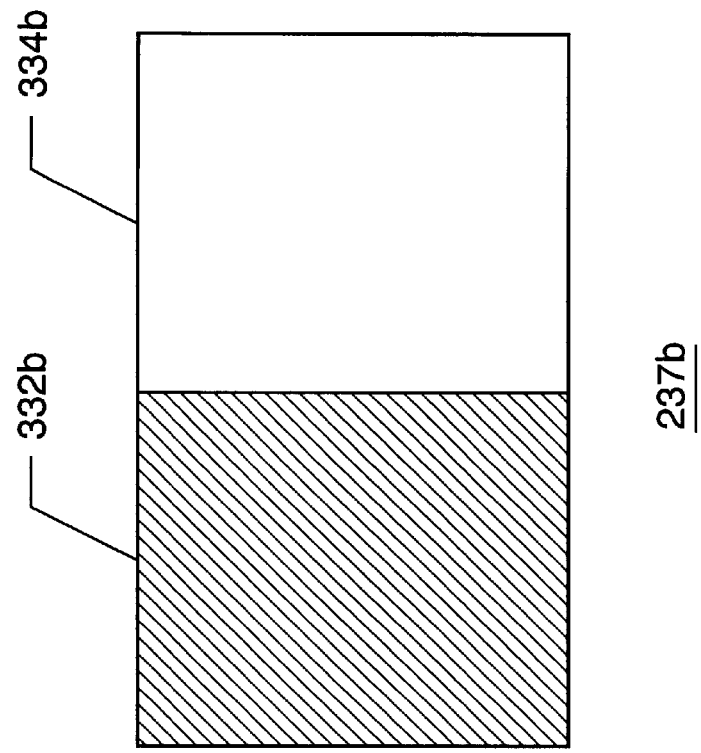
FIGS. 3a and 3b illustrate video images generated in the stereo video microscope of FIG. 2.
Figure 3A:
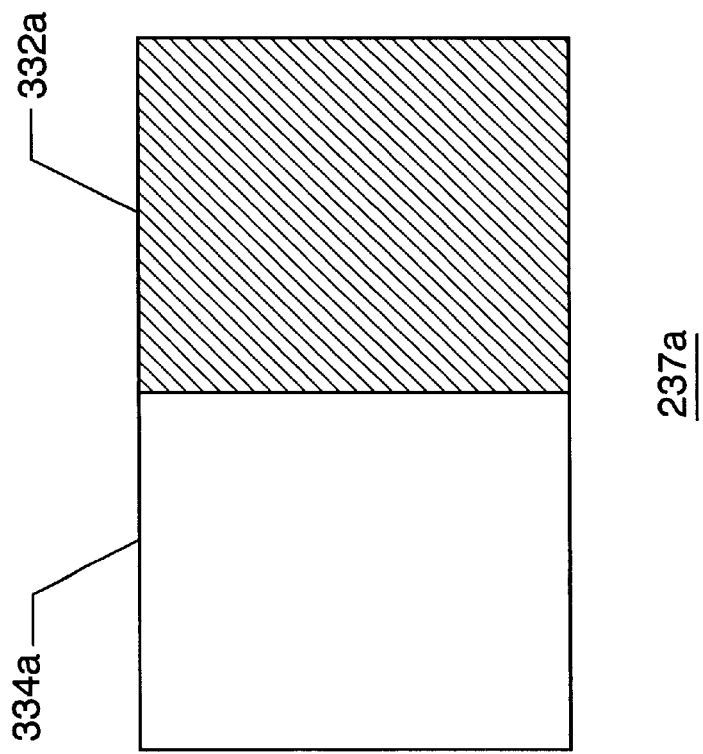

FIGS. 3a and 3b illustrate video images 237a and 237b, respectively, output by the left/right frame separator 235. Referring to FIG. 3a, in the signal 237a, the right portion 332a of the frame is masked out such that only the left portion 334a remains. On the other hand, referring to FIG. 3b, in the signal 237b, the left portion 332b of the frame is masked out such that only the right portion 334b remains.

Referring back to FIG. 2, these signals 237a/237b are provided as inputs to a multiplexer 240. The signals 237a/237b may be temporally stored or buffered in left and right frame memories 270a and 270b, respectively. Based on a selection signal provided by the clocked selection signal generator 250, the multiplexer 240 provides one of the signals 237a or 237b as an output signal 245. Thus, the output signal 245 will include alternating signals 237a and 237b.

The output signal 245 may be provided to a three-dimensional video monitor 260. The monitor 260 polarizes the alternating (e.g., left and right) video frames perpendicular to each other. When a viewer (not shown) wears special polarized glasses 270 having perpendicularly polarized lenses, each eye will only see one of the alternating video displays, thus creating a three dimensional viewing effect. Alternatively, two small head mounted displays (e.g., liquid crystal devices (or "LCDs")) may render the alternating video signals to left and right eyes of a viewer wearing the head mounted displays.

Referring back to FIGS. 1 and 2, the objective lens 110 should be easily removable so that it may be replaced with other objective lenses to permit viewing an object at various magnifications.

The single objective lens 110 and stereo doublet lens 120 combination advantageously permits "contact" type microscopy applications. Referring to FIG. 4, if a system 400 has two separate objective lenses 420a and 420b for focusing images of an object (not shown) onto CCDs 430a and 430b, the three dimensional field of view 410 will be located at a distance d from a plane defined by the objective lenses 420a and 420b. Referring now to FIG. 5, in a system 500 having a single objective lens 520 and a stereo doublet lens system 525 for focusing images of an object (not shown) onto image-to-signal converters 530a and 530b (or a single image-to-signal converter), the three dimensional field of view 510 will be located at a distance d' from the objective lens 520. Clearly, the distance d' is much less than d. As can be appreciated by this relatively short distance d', contact type operations (i.e., where the object being viewed contacts or almost contacts the objective lens 520) is permitted.

Figure 8:
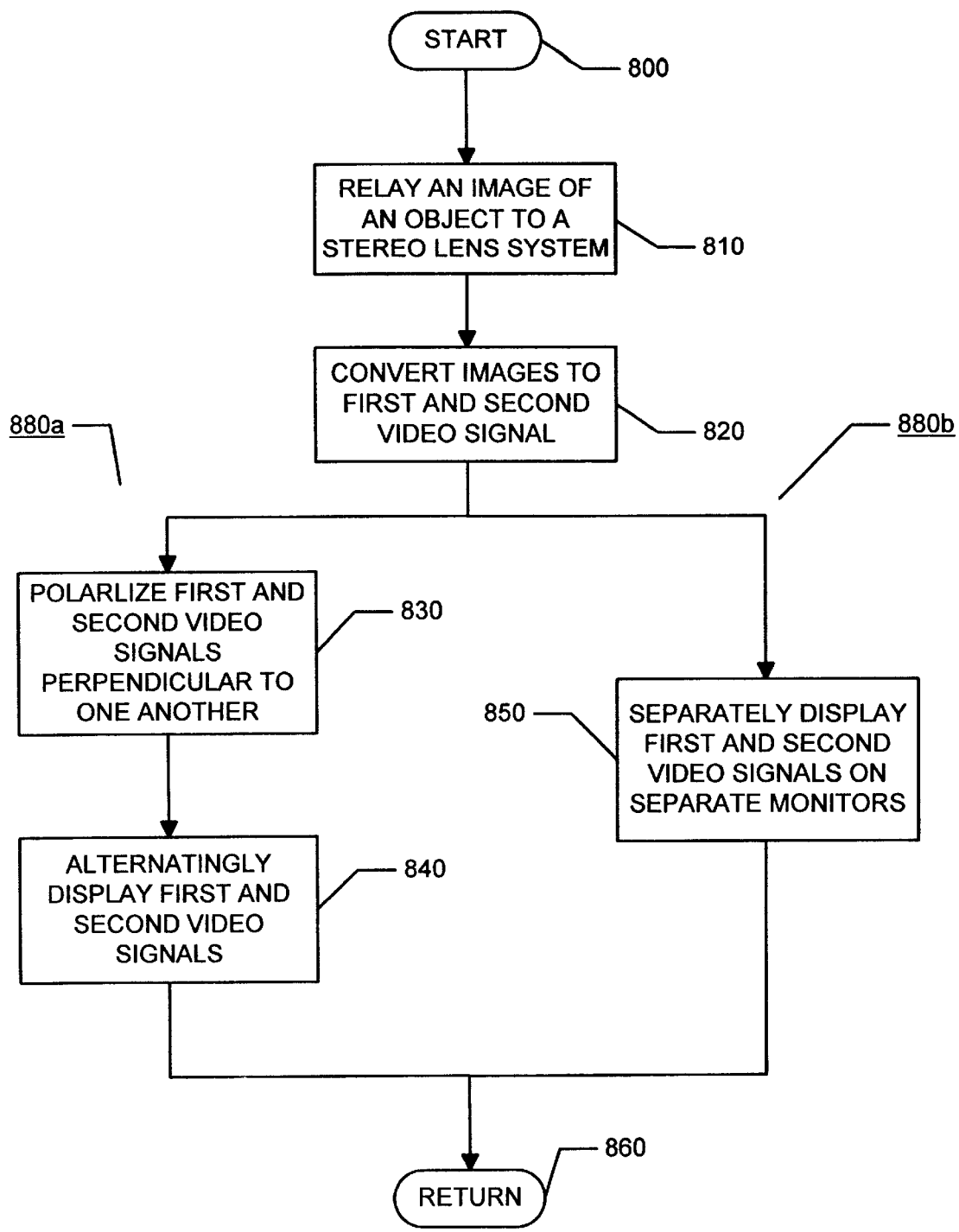
FIG. 8 is a flow diagram of operations which may be carried out by the exemplary embodiments of the present inventions.

FIG. 8 is a high level flow diagram of operations that may be performed by the present invention. Processing commences via start node 800. As shown in step 810, an image of the object to be viewed is relayed to a stereo lens system, such a stereo doublet lens for example. Next, as shown in step 820, images emitted by the stereo lens system are converted to first and second (e.g., left and right) video signals. Processing may continue via branch 880a and/or branch 880b. In branch 880a, the first and second (e.g., left and right) video signals are polarized perpendicular to one another as shown in step 830. Next, as shown in step 840, the first and second (e.g., left and right) polarized video signals are alternatingly displayed. In alternative branch 880b, the first and second (e.g., left and right) video signals are displayed on separate monitors as shown in step 850. Processing continues via return node 860.

Figure 6:
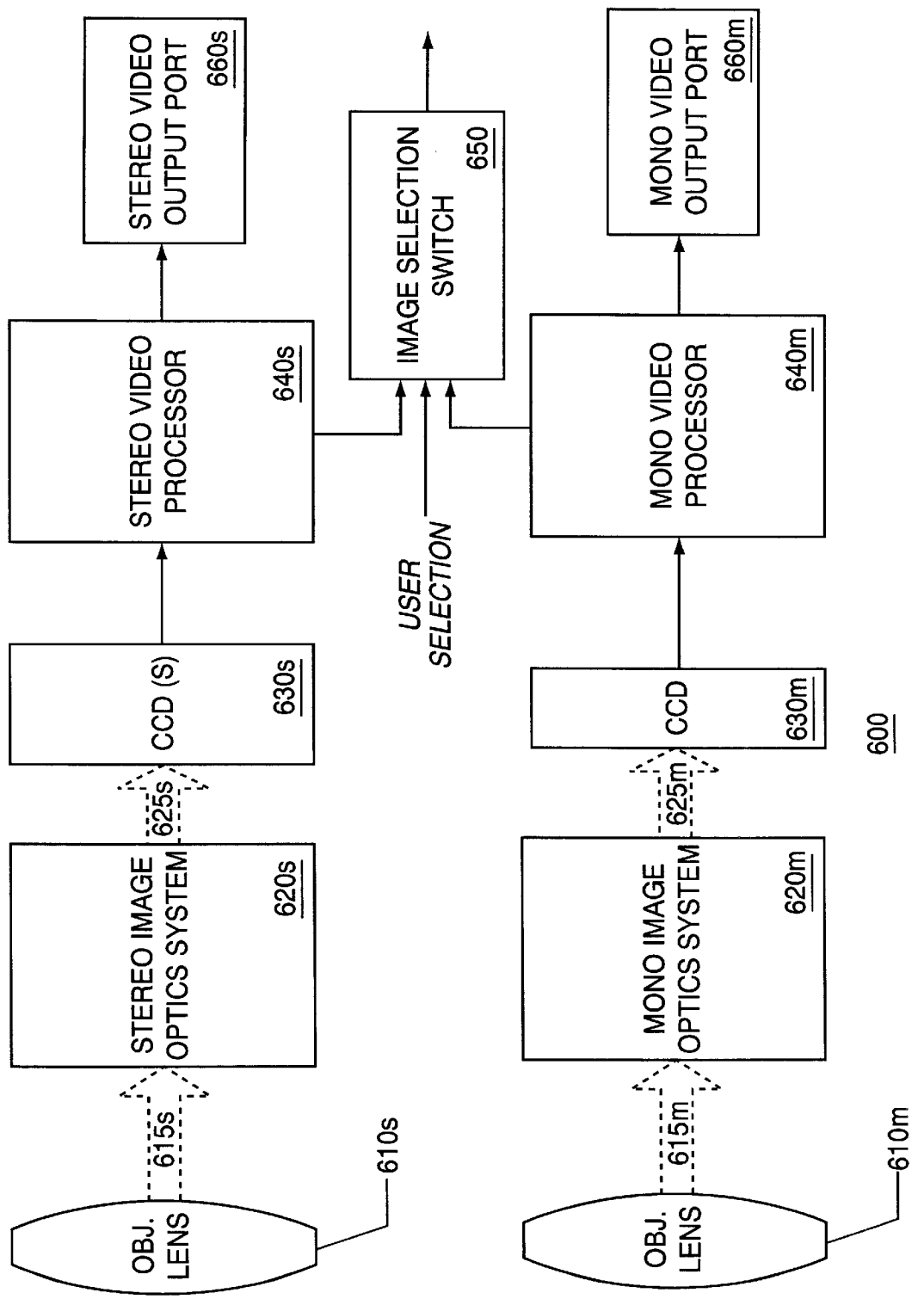
FIG. 6 is an exemplary embodiment of a switchable stereo/mono video microscope system in accordance with the present invention.
Figure 7:
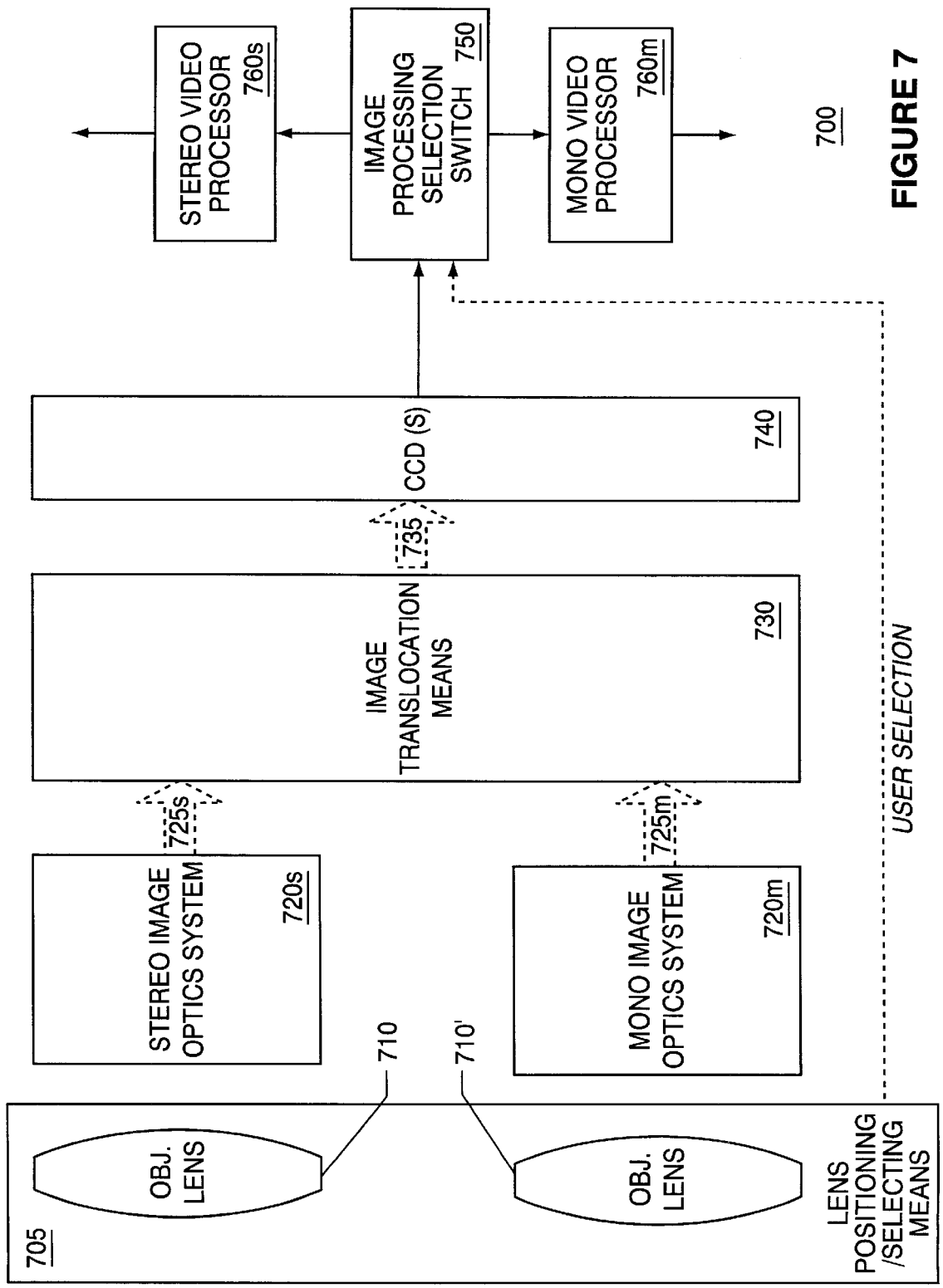
FIG. 7 is another exemplary embodiment of a switchable stereo/mono video microscope system in accordance with the present invention.

Though, as discussed above, stereo video microscopes advantageously permit a viewer to perceive depth, thereby providing enhanced detail, stereo imaging has some disadvantages, such as problems with continuous zooming functions. In this regard, monoscopic (i.e., two-dimensional) video may be preferable. FIGS. 6 and 7 are block diagrams of exemplary systems for permitting both stereoscopic and monoscopic video images to be rendered (e.g., displayed).

The stereo/mono video microscope system 600 of FIG. 6 includes a stereo portion, depicted in the upper portion of the drawing, and a mono portion, depicted in the lower portion of the drawing. In the stereo portion, an objective lens 610s focuses images 615s of an object (not shown) onto a stereo image optics system (e.g., a stereo doublet lens as illustrated in FIGS. 1 and 2) 620s. In turn, the stereo image optics system focuses images 625 of the object onto one (Recall, e.g., embodiment 200 of FIG. 2.) or more (Recall, e.g., embodiment 100 of FIG. 1.) image-to-signal converters (e.g., CCDs) 630s. Signals provided by the image-to-signal converter(s) 630s are provided to a stereo video processor 640s. For example, if a single image-to-signal converter 630s is used, as was the case with the system 200 illustrated in FIG. 2, then the stereo video processor 640s may include a left/right frame separator 235, left and right frame memories 270, a multiplexer 240, and a clocked selection signal generator 250. If, on the other hand, two (2) image-to-signal converters are used, as was the case with the system 100 illustrated in FIG. 1, then the stereo video processor 640s may include a multiplexer 140 and a clocked selection signal generator 150. The stereo video signal output by the stereo video processor 630s is made available at a stereo video output port 660s and/or an input of an image selection switch 650.

In the monoscopic portion, an objective lens 610m focuses an image 615m of an object (not shown) onto a mono image optics system 620m (e.g., a zoom optical system). In turn, the mono image optics system 620m focuses the image 625m of the object onto an image-to-signal converter (e.g., a CCD) 630m. Signals provided by the image-to-signal converter 630m are provided to a mono video processor 640m. The mono video signal (e.g., NTSC (National Television Standards Committee of the Electronic Industries Association), PAL, SECAM or S-VIDEO compliant video frames) output by the mono video processor 630m is made available at a mono video output port 660m and/or an input of an image selection switch 650.

The image selection switch 650 may provide one of the two input signals to an output, in accordance with a user selection input.

Referring back to FIGS. 2 and 3, as well as FIG. 6, it is possible to provide a single image-to-signal converter 630 having two regions, one for stereo images (having two sub-regions) and one for mono image, rather than two (or three) separate image-to-signal converters 630s and 630m. In this case, a mono-stereo frame separator, as well as a left/right frame separator, may be used.

The stereo/mono video microscope system 700 of FIG. 7 differs from that 600 of FIG. 6 in that, it uses just one (1) or two (2) image-to-signal converters (e.g., CCDs) rather than two (2) or three (3), and it includes a lens positioning or selecting means 705 and an image translocation means 730. First, an image of an object (not shown) is provided to either the stereo image optics system 720s or the mono image optics system 720m.

If only one (1) objective lens 710 is provided, then a lens positioning means 705 is used to position the objective lens 710 with respect to the desired one of the stereo or mono image optics systems 720s (e.g., a stereo doublet lens) or 720m (e.g., zoom optical system), respectively. The lens positioning means 705 may be a rotateable disk having the objective lens arranged off-center. Alternatively, the lens positioning means 705 may be a sliding plate housing the objective lens 710. Naturally, any device for positioning the objective lens 710 with respect to either the stereo image optics system 720s or the mono image optics system 720m may, in theory, be used.

If two (2) objective lenses 710 are provided, then a lens selecting means 705 is provided to block one image from one of the objective lenses 710 from reaching the stereo or mono image optic system 720s or 720m, respectively, while permitting another image from the other one of the objective lenses 710 to reach the mono or stereo image optic system 720m or 720s. For example a shutter may be used to block one of the objective lenses 710. Naturally, any device for selecting one of the objective lenses may, in theory, be used.

Then, either a stereo image 725s or a mono image 725m is provided to an image-to-signal converter (e.g., a CCD) 740. An image translocation means, such as mirrors and/or prisms for example, may be used to translocate the image 725s or 725m, to an image 735 applied to a central region of the image-to-signal converter 740. Naturally, any device for translocating the images may, in theory, be used.

The signal output by the image-to-signal converter 740 is provided to an input of an image processing selection switch. Based on a user selection input, which may correspond to the position of the one (1) objective lens 710 or the selection of one of the two (2) objective lenses 710, the signal is provided, to either a stereo video processor 760s or a mono video processor 760m.

To summarize, the present invention allows a three dimensional image of the object, which may be close to, or in contact with, an objective lens, to be rendered in video. The present invention may permit both stereo and mono operations to achieve the advantages of both. Naturally, ancillary peripheral equipment, such a video storage units (e.g., video tape or disk storage), video processing, etc. may also be provided. The concepts of the present invention may be applied to other applications, such as high speed video applications for example.

What is claimed is:

1. A device for providing a three-dimensional video image of an object, the device comprising:
   a) a stereo doublet lens system;
   b) an objective lens arranged between the object and the stereo lens system;
   c) a one-piece image-to-signal converter for converting each of a pair of images, received by the one-piece image-to-signal converter, at one time, from the stereo doublet lens system, to a signal having a first portion corresponding to a first of the pair of images and a second portion corresponding to a second of a pair of images;
   d) a frame separator for providing a first signal based on the first portion of the signal and a second signal based on a second portion of the signal;
   e) a multiplexer for selectively providing an output signal from the first and second signals, based on a selection signal; and
   f) means for rendering the output signal.

2. The device of claim 1 wherein the image-to-signal converter is a charge coupled device.

3. The device of claim 1 wherein the means for rendering the output signal include a video monitor which polarizes alternating input video frames perpendicular to one another.

4. The device of claim 1 wherein the means for rendering the output signal include a head mountable device having a first video monitor and a second video monitor.

5. The device of claim 4 wherein each of the first and second video monitors is a liquid crystal display.

6. A device for providing a three-dimensional video image of an object, the device comprising:
   a) a stereo doublet lens system;
   b) an objective lens arranged between the object and the stereo lens system;
   c) a one-piece image-to-signal converter for converting a pair of images, received by the one-piece image-to-signal converter, at one time, from the stereo doublet lens system, to a signal having a first portion corresponding to a first of the pair of images and a second portion corresponding to a second of the pair of images;
   d) a frame separator for providing a first signal based on the first portion of the signal and a second signal based on the second portion of the signal; and
   e) a multiplexer for selectively providing an output signal from the first and second signals, based on a selection signal.

7. The device of claim 6 wherein the image-to-signal converter is a charge coupled device.

8. A device for generating a selected one of a mono and stereo video image of an object, the device comprising:
   a) a stereo image optics system;
   b) a separate mono image optics system;
   c) means for arranging a single objective lens system between the object and a selected one of (i) the stereo image optics system and (ii) the mono image optics system;
   d) an image-to-signal converter for receiving images from the selected one of the stereo image optics system and the mono image optics system and for providing a signal based on the received images;
   e) a stereo video processor for providing a stereo video signal based on a received signal;
   f) a separate mono video processor for providing a mono video signal based on a received signal; and
   g) means for providing the signal to the selected one of the stereo and mono video processors.

9. The device of claim 8 further comprising:
   h) image translocation means arranged between the image-to-signal converter and the stereo image optics system and the mono image optic system.

* * * * *